(12) United States Patent
Horie et al.

(10) Patent No.: US 12,252,616 B2
(45) Date of Patent: Mar. 18, 2025

(54) CURABLE SILICONE COMPOSITION, ENCAPSULANT AND OPTICAL SEMICONDUCTOR DEVICE

(71) Applicants: DuPont Toray Specialty Materials Kabushiki Kaisha, Tokyo (JP); DuPont Specialty Materials Korea Ltd., Cheonan-si (KR)

(72) Inventors: Sawako Horie, Chiba (JP); Kasumi Takeuchi, Chiba (JP); Shunya Takeuchi, Chiba (JP); Hyunji Kang, Gyeonggi-Do (KR); Akihiko Kobayashi, Chiba (JP)

(73) Assignees: Dupont Toray Specialty Materials Kabushiki Kaisha, Tokyo (JP); DuPont Specialty Materials Korea Ltd., Chenonan-si (KR)

( * ) Notice: Subject to any disclaimer, the term of this patent is extended or adjusted under 35 U.S.C. 154(b) by 683 days.

(21) Appl. No.: 17/644,623

(22) Filed: Dec. 16, 2021

(65) Prior Publication Data
US 2022/0204771 A1 Jun. 30, 2022

(30) Foreign Application Priority Data
Dec. 28, 2020 (JP) ................ 2020-219285

(51) Int. Cl.
*C08L 83/06* (2006.01)
*C08G 77/00* (2006.01)
(Continued)

(52) U.S. Cl.
CPC ......... *C08L 83/06* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| 2015/0001596 A1* | 1/2015 | Lee | H01L 29/4238 257/288 |
| 2019/0203088 A1* | 7/2019 | Tsushima | C08G 77/08 |

FOREIGN PATENT DOCUMENTS

| JP | 2007327019 A | 12/2007 |
| JP | 20101335 A | 1/2010 |

(Continued)

*Primary Examiner* — Randy P Gulakowski
*Assistant Examiner* — Ha S Nguyen
(74) *Attorney, Agent, or Firm* — Lorenz & Kopf LLP

(57) ABSTRACT

Curable silicone compositions, encapsulants including the same, and optical semiconductor devices including the encapsulants are provided herein. In an embodiment, a curable silicone composition includes: (A) an alkenyl group-containing organopolysiloxane having at least two alkenyl groups per molecule; (B) an organohydrogenpolysiloxane having at least two silicon atom-bonded hydrogen atoms per molecule; (C) an epoxy group-containing resinous organopolysiloxane represented by Average Unit Formula (I): $(R^1{}_3SiO_{1/2})_f(R^2{}_2SiO_{2/2})_g(R^1SiO_{3/2})_h(SiO_{4/2})_i(XO_{1/2})_j$ wherein $R_1$ are independently halogen-substituted or unsubstituted monovalent hydrocarbon groups, at least two $R^1$ are alkenyl groups; $R^2$ are independently halogen-substituted or unsubstituted monovalent hydrocarbon groups or epoxy group-containing organic groups, wherein at least one $R^2$ is an epoxy group-containing organic group; X is a hydrogen atom or an alkyl group; $0 \leq f < 1$; $0 < g < 1$; $0 \leq h < 0.9$; $0 \leq i < 0.5$; and $0 < j < 0.5$; $f+g+h+i+j=1.0$; $h+i>0$; and $j/(f+g+h+i+j) > 0.05$ and (D) a curing catalyst.

10 Claims, 1 Drawing Sheet

(51) Int. Cl.
*C08G 77/12* (2006.01)
*C08G 77/14* (2006.01)
*C08G 77/20* (2006.01)
*C08K 7/26* (2006.01)
*C08L 83/04* (2006.01)
*C09J 11/04* (2006.01)
*C09J 183/04* (2006.01)
*H01L 23/29* (2006.01)
*H01L 33/56* (2010.01)

(56) References Cited

FOREIGN PATENT DOCUMENTS

| | | | |
|---|---|---|---|
| JP | 2016138268 A | 8/2016 | |
| JP | 2017200962 A | * 11/2017 | ............. C08G 77/08 |

* cited by examiner

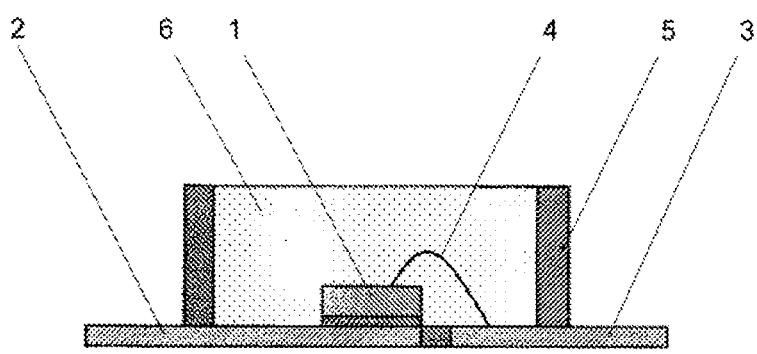

CURABLE SILICONE COMPOSITION, ENCAPSULANT AND OPTICAL SEMICONDUCTOR DEVICE

CROSS-REFERENCE TO RELATED APPLICATION

This application claims priority to Japanese Patent Application No. 2020-219285, filed Dec. 28, 2020, which is incorporated herein by reference it its entirety.

TECHNICAL FIELD

The present disclosure relates to a curable silicone composition, and more specifically relates to a curable silicone composition that is suitable for use in encapsulants for optical semiconductors. The present disclosure also relates to an optical semiconductor device sealed with an encapsulant comprising a cured product of the curable silicone composition.

BACKGROUND

When curable silicone compositions are cured, they form cured products having excellent heat resistance, cold resistance, electrical insulation, weather resistance, water repellency, and transparency, and so they are used in a wide range of industrial fields. In particular, these cured products are less prone to discoloration and their physical properties deteriorate less, and so they are particularly suitable for optical materials, and in particular are widely used as silicone encapsulants used in optical semiconductor devices such as light emitting diodes (LEDs).

Generally, curable silicone compositions, and particularly hydrosilylation curable silicone compositions, may have insufficient adhesiveness to substrates such as metals or resins, and therefore curable silicone compositions to which adhesive-imparting agents are added are conventionally known.

For example, an adhesion promoter is known represented by the average formula: $R^1_a SiO_{(4-a)/2}$ (in the formula, $R^1$ is selected from the group of substituted or unsubstituted C1-10 alkyl groups, C2-20 alkenyl groups, C6-20 aryl groups, C1-10 alkoxy groups, and epoxy group-containing organic groups, wherein, in one molecule, the content of the alkenyl groups is at least 5 mol % of the total $R^1$, the content of the aryl groups is at least 5 mol % of the total $R^1$, the content of the alkoxy groups is at least 5 mol % of the total $R^1$, the content of the epoxy group-containing organic groups is at least 5 mol % of the total $R^1$, and a is an integer satisfying $1.0 \leq a < 4.0$). A curable organopolysiloxane composition including said adhesion promoter is also known.

Furthermore, a curable organopolysiloxane composition is known at least comprising (A) an organopolysiloxane represented by the average structural formula: $R^1_a SiO_{(4-a)/2}$ (wherein $R^1$ is an unsubstituted or halogen-substituted monovalent hydrocarbon group; wherein, in one molecule, at least two $R^1$ are alkenyl groups, and at least 30 mol % of the total $R^1$ are aryl groups; and a is a number from 0.6 to 2.1); (B) an organopolysiloxane having, in one molecule, at least two silicon atom-bonded hydrogen atoms and in which at least 15 mol % of all silicon-bonded organic groups are aryl groups; (C) a branched-chain organopolysiloxane represented by the average unit formula: $(R^2 SiO_{3/2})_b (R^2_2 SiO_{2/2})_c (R^2_3 SiO_{1/2})_d (SiO_{4/2})_e (XO_{1/2})_f$ {in the formula, each $R^2$ is independently an alkyl group, alkenyl group, aryl group, or an epoxy-containing organic group; wherein, in one molecule, of all the $R^2$, at least 5 mol % are alkenyl groups, at least 15 mol % are aryl groups, and at least 10 mol % are epoxy-containing organic groups; X is a hydrogen atom or an alkyl group; b is a positive number; c is 0 or a positive number; d is 0 or a positive number; e is 0 or a positive number; f is 0 or a positive number; c/b is a number from 0 to 10; d/b is a number from 0 to 5; e/(b+c+d+e) is a number from 0 to 0.3; and f/(b+c+d+e) is a number from 0 to 0.02}; and (D) a hydrosilylation catalyst, wherein: the content of the (B) component is such that the molar ratio of the silicon atom-bonded hydrogen atoms included in the (B) component to the alkenyl groups included in the (A) component and the (C) component is 0.1 to 5; the content of (C) component is 0.1 to 20 parts by mass with respect to a total of 100 parts by mass of the sum of the (A) component and the (B) component; and the content of the (D) component is an amount with which curing of the composition is accelerated.

Furthermore, an adhesion promoter satisfying Chemical Formula 1 is known, wherein, in Chemical Formula 1, $R^1_a SiO_{(4-a)/2}$, $R^1$ represents a C1-20 alkyl group, a C3-20 cycloalkyl group, a C2-20 alkenyl group, a C6-20 aryl group, a C6-20 arylalkyl group, a C1-20 alkoxy group, or an epoxy-containing organic group, wherein a is a number satisfying the condition $1.0 \leq a < 4.0$; one or more of $R^1$ is substituted with one or more substituents selected from the group consisting of a C1-10 alkyl group, a C6-10 aryl group and a halogen group, or unsubstituted and, in one molecule, the content of aryl groups is 20 mol % or more of all substituents indicated by $R^1$; the content of epoxy-containing organic groups is 15-30 mol % of all substituents indicated by $R^1$; the content of alkoxy groups is 5 mol % or less of all the substituents indicated by $R^1$; and the molar ratio of the alkenyl groups to the epoxy-containing organic groups is 0.3:1 to 1.2:1. A curable organopolysiloxane composition including said adhesion promoter is also known.

However, with curable silicone compositions containing conventional adhesion promoters, when a phosphor was blended, the dispersibility of the phosphor was low, and the light extraction efficiency from the light emitting element was not sufficient. Because the curable silicone compositions had insufficient thixotropy, there was a problem in that, even if an appropriate amount thereof was applied directly to an optical semiconductor on a support substrate using a dispenser and cured, the curable silicone composition that was applied would run, such that a cured product having the desired shape could not always be obtained. Furthermore, with hot melting silicone compositions including conventional adhesion promoters, there was also a problem of shape shrinkage during curing, as a result of which, there were cases of flexible substrates warping and the patterning accuracy being inferior in semiconductor element mounting processes.

BRIEF SUMMARY

Curable silicone compositions, encapsulants including the same, and optical semiconductor devices including the encapsulants are provided herein. In an embodiment, a curable silicone composition includes: (A) an alkenyl group-containing organopolysiloxane having at least two alkenyl groups per molecule; (B) an organohydrogenpolysiloxane having at least two silicon atom-bonded hydrogen atoms per molecule; (C) an epoxy group-containing resinous organopolysiloxane represented by Average Unit Formula (I): $(R^1_3 SiO_{1/2})_f (R^2_2 SiO_{2/2})_g (R^1 SiO_{3/2})_h (SiO_{4/2})_i (XO_{1/2})_j$ wherein $R_1$ are independently halogen-substituted or unsubstituted monovalent hydrocarbon groups, at least two $R^1$ are alkenyl groups; $R^2$ are independently halogen-substituted or unsubstituted monovalent hydrocarbon groups or epoxy group-containing organic groups, wherein at least one $R^2$ is an epoxy group-containing organic group; X is a hydrogen atom or an alkyl group; $0 \leq f < 1$; $0 < g < 1$; $0 \leq h < 0.9$; $0 \leq i < 0.5$; and $0 < j < 0.5$; $f+g+h+i+j=1.0$; $h+i>0$; and $j/(f+g+h+i+j) > 0.05$ and (D) a curing catalyst.

BRIEF DESCRIPTION OF THE DRAWINGS

The present disclosure will hereinafter be described in conjunction with the following drawing FIGURES, wherein like numerals denote like elements, and wherein:

FIG. 1 is a sectional view of an LED that is an example of the inventive optical semiconductor device.

DETAILED DESCRIPTION

The following detailed description is merely exemplary in nature and is not intended to limit the present disclosure or the application and uses thereof. Furthermore, there is no intention to be bound by any theory presented in the preceding background or the following detailed description. In this disclosure, the terminology "about" can describe values ±0.1, 0.5, 1, 2, 3, 4, 5, 6, 7, 8, 9, or 10%, in various embodiments. Moreover, it is contemplated that, in various non-limiting embodiments, all values set forth herein may be alternatively described as approximate or "about."

An object of the present disclosure is to provide a curable silicone composition that can achieve both excellent adhesive strength and light extraction efficiency.

Another objective of the present disclosure is to provide a sealing material including the curable silicone composition of the present disclosure. Yet another objective of the present disclosure is to provide an optical semiconductor device that is sealed with the sealing material of the present disclosure.

As a result of diligent studies directed to solving the problems described above, the present inventors surprisingly found that a curable silicone composition including an epoxy group-containing resinous organopolysiloxane having a specific structure can achieve both excellent adhesive strength and light extraction efficiency. Furthermore, the present inventors found that, when a filler or a phosphor is blended, the dispersibility of the filler or the phosphor is improved, whereby excellent thixotropy can be achieved while maintaining excellent light extraction efficiency, even if small amounts of filler or phosphor are added, and it is possible to reduce shape change and shrinkage factors when cured, and thus the subject matter of the present disclosure was achieved.

The present disclosure thus relates to a curable silicone composition comprising:
(A) an alkenyl group-containing organopolysiloxane having at least two alkenyl groups per molecule;
(B) an organohydrogenpolysiloxane having at least two silicon atom-bonded hydrogen atoms per molecule;
(C) an epoxy group-containing resinous organopolysiloxane represented by Average Unit Formula (I):

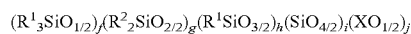

{in Formula (I), $R^1$ are, in each case, independently halogen-substituted or unsubstituted monovalent hydrocarbon groups, wherein at least two $R^1$ are alkenyl groups; $R^2$ are, in each case, independently halogen-substituted or unsubstituted monovalent hydrocarbon groups or epoxy group-containing organic groups, wherein at least one $R^2$ is an epoxy group-containing organic group; X is a hydrogen atom or an alkyl group; $0 \leq f < 1$; $0 < g < 1$; $0 \leq h < 0.9$; $0 \leq i < 0.5$; and $0 < j < 0.5$; $f+g+h+i+j=1.0$; $h+i>0$; and $j/(f+g+h+i+j) > 0.05$};

and (D) a curing catalyst.

In the aforementioned Formula (I), it is preferable that at least 30 mol % of $R^1$ are aryl groups.

Preferably, the (A) alkenyl group-containing organopolysiloxane includes resinous organopolysiloxane, linear organopolysiloxane, or both, in which the quantity of aryl groups in all of the silicon atom-bonded functional groups is 20 mol % or more.

Preferably, the (B) organohydrogenpolysiloxane contains both linear organohydrogenpolysiloxane and resinous organohydrogenpolysiloxane.

The curable silicone composition of the present disclosure may further include silica as an inorganic filler.

The present disclosure also relates to a sealing material comprising the curable silicone composition according to the present disclosure.

The present disclosure also relates to an optical semiconductor device that is equipped with the sealing material according to the present disclosure.

With the curable silicone composition according to the present disclosure, a curable silicone composition capable of achieving both excellent adhesive strength and light extraction efficiency can be provided. Furthermore, a curable silicone composition can be provided with which, when a filler or a phosphor is contained, excellent thixotropy and light extraction efficiency can be achieved by improving the dispersibility of the filler or the phosphor, and the shape change and shrinkage factor when cured are reduced.

[Curable Silicone Composition]

The curable silicone composition according to the present disclosure comprises:
(A) an alkenyl group-containing organopolysiloxane having at least two alkenyl groups per molecule;
(B) an organohydrogenpolysiloxane having at least two silicon atom-bonded hydrogen atoms per molecule;
(C) an epoxy group-containing resinous organopolysiloxane represented by Average Unit Formula (I):

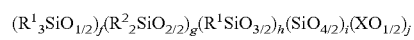

{in Formula (I), $R^1$ are, in each case, independently halogen-substituted or unsubstituted monovalent hydrocarbon groups, wherein at least two $R^1$ are alkenyl groups; $R^2$ are, in each case, independently halogen-substituted or unsubstituted monovalent hydrocarbon groups or epoxy group-containing organic groups, wherein at least one $R^2$ is an epoxy group-containing organic group; X is a hydrogen atom or an alkyl group; $0 \leq f < 1$; $0 < g < 1$; $0 \leq h < 0.9$; $0 \leq i < 0.5$; and $0 < j < 0.5$; $f+g+h+i+j=1.0$; $h+i>0$; and $j/(f+g+h+i+j) > 0.05$};

and (D) a curing catalyst.

The components of the curable silicone composition of the present disclosure are described in detail below.

(A) Alkenyl Group-Containing Organopolysiloxane Having at Least Two Alkenyl Groups Per Molecule Component (A), which is a principal component of the present composition, is a curable organopolysiloxane having at least two alkenyl groups in one molecule. The curable silicone composition according to the present disclosure may comprise one type of the alkenyl group-containing organopolysiloxane (A) or may comprise two or more types of the alkenyl group-containing organopolysiloxane (A).

Examples of the molecular structure of the (A) component are linear, linear with some branching, branched, resinous, cyclic, and 3D network structures. Component (A) can be one organopolysiloxane having such a molecular structure, or a mixture of two or more such organopolysiloxanes. Preferably, the inventive curable silicone composition contains both linear alkenyl group-containing organopolysiloxane and resinous alkenyl group-containing organopolysiloxane as (A) component. In the present specification, the term "resinous" means that there is a branched structure or a 3D network structure in the molecular structure.

Examples of alkenyl groups in the (A) component include C2-12 alkenyl groups such as vinyl, allyl, butenyl, pentenyl, hexenyl, heptenyl, octenyl, nonenyl, decenyl, undecenyl, and dodecenyl groups, and vinyl groups are preferred.

Examples of a group that bonds to a silicon atom other than the alkenyl group in component (A) include halogen-substituted or unsubstituted monovalent hydrocarbon groups other than alkenyl groups, and specific examples include: C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in component (A) may have a small quantity of hydroxyl groups or an alkoxy group such as a methoxy group or ethoxy group within a range that does not hinder the objectives of the present disclosure. Silicon atom-bonded groups other than alkenyl groups in (A) component are preferably selected from among C1-6 alkyl groups, particularly methyl groups, and C6-20 aryl groups, particularly phenyl groups.

In one embodiment of the present disclosure, the (A) component may contain a resinous alkenyl group-containing organopolysiloxane as an (A-1) component. The (A-1) resinous alkenyl group-containing organopolysiloxane can preferably be represented by average unit Formula (II):

$(R^3_3SiO_{1/2})_a(R^3_2SiO_{2/2})_b(R^3SiO_{3/2})_c(SiO_{4/2})_d(XO_{1/2})_e$ (in Formula (II), $R^3$ are identical or different halogen-substituted or unsubstituted monovalent hydrocarbon groups, where at least two $R^3$ in one molecule are alkenyl groups; $0 \le a < 1$; $0 \le b < 1$; $0 \le c < 0.9$; $0 \le d < 0.5$; and $0 \le e < 0.4$; $a+b+c+d=1.0$; and $c+d>0$).

Examples of the halogen-substituted or unsubstituted monovalent hydrocarbon groups $R^3$ in Formula (II) are C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; C2-12 alkenyl groups such as vinyl, allyl, butenyl, pentenyl, hexenyl, heptenyl, octenyl, nonenyl, decenyl, undecenyl, and dodecenyl groups; and groups obtained by substituting some or all of the hydrogen atoms of these groups with halogen atoms such as fluorine, chlorine, or bromine atoms. $R^3$ may also be a hydroxyl group or an alkoxy group such as methoxy or ethoxy, in small amounts, provided that the object of the present disclosure is not thereby compromised. $R^3$ is preferably selected from among C1-6 alkyl groups, particularly a methyl group, C2-6 alkenyl groups, particularly a vinyl group, or C6-20 aryl groups, particularly a phenyl group.

X in Formula (II) above is a hydrogen atom or an alkyl group. Preferred examples of alkyl groups represented by X include C1-3 alkyl groups, specifically methyl, ethyl, and propyl groups.

In Formula (II) above, a is preferably in the range of $0.1 \le a \le 0.8$, more preferably in the range of $0.15 \le a \le 0.6$, even more preferably in the range of $0.2 \le a \le 0.4$. In Formula (II) above, b is preferably in the range of $0 \le b \le 0.6$, more preferably in the range of $0 \le b \le 0.5$, and particularly in the range of $0 \le b \le 0.4$. In Formula (II) above, c is preferably in the range of $0.2 \le c < 0.9$, more preferably in the range of $0.3 \le c \le 0.85$, and particularly in the range of $0.4 \le c \le 0.8$. In Formula (II) above, d is preferably in the range of $0 \le d \le 0.4$, more preferably in the range of $0 \le d \le 0.25$, and particularly in the range of $0 \le d \le 0.1$. In Formula (II) above, e is preferably in the range of $0 \le e \le 0.15$, more preferably in the range of $0 \le e \le 0.1$, and particularly in the range of $0 \le e \le 0.05$.

In a preferred embodiment of the present disclosure, the (A-1) component resinous alkenyl group-containing organopolysiloxane is such that, in Formula (II) above, c is greater than 0, which is to say that it includes a siloxane unit represented by $SiO_{3/2}$ (T unit). The (A-1) component resinous organopolysiloxane may or may not, and preferably does not, include a siloxane unit represented by $SiO_{4/2}$ (Q unit).

In a preferred embodiment of the present disclosure, the resinous alkenyl group-containing organopolysiloxane of (A-1) component includes an alkenyl group at a molecular terminal. The resinous organopolysiloxane of (A-1) component preferably has alkenyl groups in the siloxane units represented by $SiO_{1/2}$ (M units), and may or may not, and preferably does not, have alkenyl groups in molecular-chain side chains (which is to say, siloxane units represented by $SiO_{2/2}$ (D units) and siloxane units represented by $SiO_{3/2}$ (T units).

The content of the alkenyl groups in all of the silicon atom-bonded organic groups of the (A-1) component resinous alkenyl group-containing organopolysiloxane is not particularly limited, and for example, can be 5 mol % or more, preferably 10 mol % or more, more preferably 15 mol % or more of the total of the silicon atom-bonded organic groups, and 40 mol % or less, preferably 30 mol %, more preferably 20 mol % or less of the total of the silicon atom-bonded organic groups. The alkenyl group content can, for example, be determined by analysis such as Fourier transform infrared spectrophotometry (FT-IR) or nuclear magnetic resonance (NMR), or by using a titration method described below.

A method for determining the alkenyl group amount in the components by using titration will be described. The alkenyl group content in the organopolysiloxane components can be accurately quantified by using a titration method generally known as the Wijs method. The principle will be described below. Firstly, an alkenyl group in the organopolysiloxane starting material and iodine monochloride are subjected to an addition reaction as shown in Formula (1). Next, according to the reaction shown in formula (2), an excess amount of iodine monochloride is reacted with potassium iodide, thereby freeing iodine. The freed iodine is subjected to titration with a sodium thiosulfate solution.

$CH_2=CH-+2ICl \rightarrow CH_2I-CHCl-+ICl(excess)$  Formula (1):

$ICl+KI \rightarrow I_2+KCl$  Formula (2):

The alkenyl group amount in the component can be quantified from the difference between the amount of sodium thiosulfate required for titration and the titration amount of the blank solution prepared separately.

In a preferred embodiment of the present disclosure, the (A-1) component resinous alkenyl group-containing organopolysiloxane includes an aryl group in the silicon atom-bonded organic group. That is to say, in Formula (II) above, at least one $R^3$ can be an aryl group. In a preferred embodiment of the disclosure, the (A-1) component resinous alkenyl group-containing organopolysiloxane contains a silicon atom-bonded aryl group in a molecular-chain side chain, that is, in a D unit or a T unit. The (A-1) component resinous alkenyl group-containing organopolysiloxane may or may not, and preferably does not, include an aryl group at the molecular terminal, that is, in the M unit. Note that, in terms of the aryl group, C6-20 aryl groups, and particularly a phenyl group, a tolyl group, a xylyl group, and a naphthyl group can be mentioned.

When the (A-1) component resinous organopolysiloxane comprises an aryl group, the content (mol % of aryl groups in all of the silicon atom-bonded functional groups of the resinous organopolysiloxane) can be designed as desired, but is normally 5 mol % or more, preferably 10 mol % or more, more preferably 15 mol % or more, still more preferably 20 mol % or more, preferentially 30 mol % or more, and particularly preferably 40 mol % or more, and can be 80 mol % or less, preferably 70 mol % or less, more preferably 65 mol % or less, preferentially 60 mol % or less, and particularly preferably 55 mol % or less. The aryl group content can, for example, be determined by analysis such as Fourier transform infrared spectrophotometry (FT-IR) or nuclear magnetic resonance (NMR).

The (A-1) component organopolysiloxane is preferably solid or semi-solid at 25° C. The number average molecular weight of the organopolysiloxane of the (A-1) component is not particularly limited, but is preferably in the range of 500 to 10,000.

When the (A) component includes the (A-1) resinous organopolysiloxane, the content thereof is not particularly limited, but is preferably 20% by mass or more, more preferably 30% by mass or more, still more preferably 40% by mass or more, and particularly preferably 50% by mass or more, based on the total mass of all the organopolysiloxane components included in the curable silicone composition of the present disclosure. The content of the (A-1) component is also preferably 90% by mass or less, more preferably 80% by mass or less, still more preferably 70% by mass or less, and particularly preferably 65% by mass or less, based on the total mass of all the organopolysiloxane components.

The (A) component may include a linear alkenyl group-containing organopolysiloxane as an (A-2) component. The (A-2) component linear alkenyl group-containing organopolysiloxane can preferably be represented by Average Structural Formula (III):

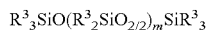

(in Formula (III), $R^3$ are the same or different halogen-substituted or unsubstituted monovalent hydrocarbon groups, where at least two $R^3$ in one molecule are alkenyl groups, and m is 1 to 500).

In Formula (III) above, the same groups as in Formula (II) above can be used for the halogen-substituted or unsubstituted monovalent hydrocarbon group of $R^3$.

In Formula (III) above, m is preferably 2 to 300, more preferably 5 to 200, still more preferably 10 to 150, and particularly preferably 15 to 100.

Examples of such an (A-2) component include: dimethylpolysiloxane capped at both ends of the molecular chain with dimethylvinylsiloxy groups, dimethylpolysiloxane capped at both ends of the molecular chain with diphenylvinylsiloxy groups, dimethylsiloxane-methylphenylsiloxane copolymers capped at both ends of the molecular chain with dimethylvinylsiloxy groups, dimethylsiloxane-diphenylsiloxane copolymers capped at both ends of the molecular chain with dimethylvinylsiloxy groups, dimethylsiloxane-methylphenylsiloxane copolymers capped at both ends of the molecular chain with diphenylvinylsiloxy groups, dimethylsiloxane-methylvinylsiloxane copolymers capped at both ends of the molecular chain with dimethylvinylsiloxy groups, dimethylsiloxane-methylphenylsiloxane-methylvinylsiloxane copolymers capped at both ends of the molecular chain with dimethylvinylsiloxy groups, dimethylsiloxane-diphenylsiloxane-methylvinylsiloxane copolymers capped at both ends of the molecular chain with dimethylvinylsiloxy groups, methylvinylpolysiloxane capped at both ends of the molecular chain with trimethylsiloxy groups, methylvinylsiloxane-methylphenylsiloxane copolymers capped at both ends of the molecular chain with trimethylsiloxy groups, methylvinylsiloxane-diphenylsiloxane copolymers capped at both ends of the molecular chain with trimethylsiloxy groups, and dimethylsiloxane-methylvinylsiloxane copolymers capped at both ends of the molecular chain with trimethylsiloxy groups.

According to a preferred embodiment of the present disclosure, the (A-2) component linear alkenyl group-containing organopolysiloxane may be a linear organopolysiloxane that has alkenyl groups at both molecular terminals in which both ends of the molecular chain are capped with alkenyl groups. The (A-2) component linear organopolysiloxane may or may not, but preferably does not, contain an alkenyl group in a molecular-chain side chain (that is, a D unit).

The (A-2) component alkenyl group content in the linear organopolysiloxane (mol % of alkenyl groups in all of the silicon atom-bonded functional groups of the linear organopolysiloxane) can be designed as desired, but is normally 0.005 mol % or more, and preferably 0.01 mol % or more, and can be 20 mol % or less, preferably 15 mol % or less, more preferably 10 mol % or less, and preferentially 7 mol % or less. The alkenyl group content can be determined, for example, by analysis such as Fourier transform infrared spectrophotometry (FT-IR), nuclear magnetic resonance (NMR), the aforementioned titration method, or the like.

In one embodiment of the present disclosure, the (A-2) component linear organopolysiloxane includes an aryl group in a silicon atom-bonded organic group. That is to say, in Formula (III) above, at least one $R^3$ can be an aryl group. According to a preferred embodiment of the present disclosure, the (A-2) component linear alkenyl group-containing organopolysiloxane has a silicon atom-bonded aryl group in a molecular-chain side chain. The (A-2) component linear organopolysiloxane may or may not, but preferably does not, include an aryl group at a molecular chain terminal (that is, an M unit).

When the (A-2) component linear organopolysiloxane comprises an aryl group, the content (mol % of aryl groups in all of the silicon atom-bonded functional groups of the linear organopolysiloxane) can be designed as desired, but is normally 15 mol % or more, preferably 20 mol % or more, more preferably 25 mol % or more, and still more preferably 30 mol % or more, and can be 75 mol % or less, preferably 65 mol % or less, more preferably 60 mol % or less, preferentially 55 mol % or less, and particularly preferably 50 mol % or less. The aryl group content can, for example, be determined by analysis such as Fourier transform infrared spectrophotometry (FT-IR) or nuclear magnetic resonance (NMR).

When the (A) component includes the (A-2) linear organopolysiloxane, the content thereof is not particularly limited, but is preferably 1% by mass or more, more preferably 5% by mass or more, still more preferably 10% by mass or more, and particularly preferably 15% by mass or more, based on the total mass of all the organopolysiloxane components included in the curable silicone composition of the present disclosure. The content of the (A-2) component is also preferably 50% by mass or less, more preferably 40% by mass or less, still more preferably 30% by mass or less, and particularly preferably 20% by mass or less, based on the total mass of all the organopolysiloxane components.

The (A) component may contain a cyclic alkenyl group-containing organopolysiloxane as a component (A-3). The (A-3) component cyclic alkenyl group-containing organopolysiloxane can preferably be represented by Average Structural Formula (IV):

(in Formula (IV), $R^3$ are identical or different halogen-substituted or unsubstituted monovalent hydrocarbon groups, where at least two $R^3$ in one molecule are alkenyl groups, and n is a number at which the viscosity at 25° C. is 1000 mPa or less).

In Formula (IV) above, the same groups as in Formula (II) above can be used for the halogen-substituted or unsubstituted monovalent hydrocarbon groups $R^3$.

In Formula (IV) above, n is a number at which the viscosity at 25° C. is 1000 mPa or less, for example, 4 to 15, preferably 4 to 10, and still more preferably 4 to 8. In the present specification, the viscosity of the organopolysiloxane component can be measured at 25° C. using a rotary viscometer per JIS K7117-1.

In one embodiment, the content of the alkenyl group included in the component (A-3) cyclic alkenyl group-containing organopolysiloxane (mol % of the alkenyl group in all of the silicon atom-bonded functional groups of the cyclic organopolysiloxane) can be designed as desired, but is normally 10 mol % or more, preferably 20 mol % or more, more preferably 30 mol % or more, further preferably 40 mol % or more, preferentially 45 mol % or more, 80 and can be mol % or less, preferably 70 mol % or less, more preferably 60 mol % or less, and preferentially 55 mol % or less. The alkenyl group content can be determined, for example, by analysis such as Fourier transform infrared spectrophotometry (FT-IR), nuclear magnetic resonance (NMR), the aforementioned titration method, or the like.

When the (A) component includes the (A-3) component cyclic organopolysiloxane, the content thereof is not particularly limited, but based on the total mass of all the organopolysiloxane components included in the curable silicone composition of the present disclosure, is 0.01% by mass or more, more preferably 0.05% by mass or more, more preferably 0.1% by mass or more, and particularly preferably 0.15% by mass or more. The content of component (A-3) is also preferably 10% by mass or less, more preferably 5% by mass or less, still more preferably 3% by mass or less, and particularly preferably 1% by mass or less, based on the total mass of all the organopolysiloxane components.

The curable silicone composition of the present disclosure preferably includes both (A-1) resinous organopolysiloxane and (A-2) linear organopolysiloxane as (A) component. The mass ratio of the contents of (A-1) resinous organopolysiloxane and (A-2) linear organopolysiloxane is not particularly limited, but the mass ratio of (A-2) linear organopolysiloxane/(A-1) the resinous organopolysiloxane is preferably 0.1 or more, more preferably 0.2 or more, still more preferably 0.25 or more, and preferably 3 or less, more preferably 1 or less, still more preferably 0.7 or less, preferentially 0.5 or less, and particularly preferably 0.4 or less.

In one preferred embodiment, the (A) component includes an alkenyl group-containing organopolysiloxane including a large quantity of aryl groups in the silicon atom-bonded functional groups, and specifically, the quantity of aryl groups in all of the silicon atom-bonded functional groups is 20 mol % or more, preferably 25 mol % or more, more preferably, 30 mol % or more of the (A-1) resinous organopolysiloxane, (A-2) linear organopolysiloxane, or both.

The content of the total (A) component is not particularly limited, but is preferably 40% by mass or more, more preferably 50% by mass or more, still more preferably 60% by mass or more, and particularly preferably 70% by mass or more, based on the total mass of the curable silicone composition. In a preferred embodiment, the content of the (A) component is 90% by mass or less, more preferably 85% by mass or less, and still more preferably 80% by mass or less, based on the total mass of the curable silicone composition.

(B) Organohydrogenpolysiloxane Having at Least Two Silicon Atom-Bonded Hydrogen Atoms Per Molecule Component (B) is an organohydrogenpolysiloxane which acts as a cross-linking agent for a curable silicone composition by way of a hydrosilylation curing reaction, and has at least two silicon atom-bonded hydrogen atoms per molecule. The curable silicone composition according to the present disclosure may comprise one type of (B) organohydrogenpolysiloxane, or may comprise two or more types of (B) organohydrogenpolysiloxane.

Examples of the molecular structure of the (B) component are linear, linear with some branching, branched, resinous, cyclic, and 3D network structures. Component (B) can be one organohydrogenpolysiloxane having such a molecular structure, or a mixture of two or more such organohydrogenpolysiloxanes. Preferably, the curable silicone composition of the present disclosure includes both linear organohydrogenpolysiloxane and resinous organohydrogenpolysiloxane as the (B) component.

Examples of silicon atom-bonded groups other than silicon atom-bonded hydrogen atoms included in the (B) component include halogen-substituted or unsubstituted monovalent hydrocarbon groups other than alkenyl groups, for example, C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in the (B) component may also have a small amount of hydroxyl groups or alkoxy groups such as methoxy or ethoxy groups, provided that this does not adversely affect the objectives of the present disclosure. Silicon atom-bonded groups other than silicon atom-bonded hydrogen atoms in the (B) component are preferably selected from among C1-6 alkyl groups, particularly methyl groups, and C6-20 aryl groups, particularly phenyl groups.

In one embodiment of the present disclosure, the (B) component can include a resinous organohydrogenpolysiloxane as a (B-1) component. The resinous organohydrogenpolysiloxane (B-1) is preferably represented by Average Unit Formula (V):

$(R^4_3SiO_{1/2})_a(R^4_2SiO_{2/2})_b(R^4SiO_{3/2})_c(SiO_{4/2})_d(XO_{1/2})_e$ (In formula (V), $R^4$ are hydrogen atoms or the same or different halogen-substituted or unsubstituted monovalent hydrocarbon groups other than alkenyl groups, provided that, in one molecule, at least two $R^4$ are hydrogen atoms; $0 \leq a < 1$; $0 \leq b < 1$; $0 \leq c < 0.9$; $0 \leq d < 0.5$; and $0 \leq e < 0.4$; $a+b+c+d=1.0$; and $c+d>0$).

Examples of the halogen-substituted or unsubstituted monovalent hydrocarbon groups other than alkenyl groups of $R^4$ in Formula (V) include C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C7-20 aralkyl groups such as benzyl, phenethyl, and phenylpropyl groups; and any of these groups in which some or all of the hydrogen atoms are substituted with halogen atoms such as fluorine, chlorine, and bromine atoms. $R^4$ may also be a hydroxyl group or an alkoxy group such as a methoxy or ethoxy group, in small amounts, within a range that does not adversely affect the object of the present disclosure. $R^4$ is preferably selected from among a hydrogen atom, C1-6 alkyl groups, particularly a methyl group, or C6-20 aryl groups, particularly a phenyl group.

In Formula (V) above X is a hydrogen atom or an alkyl group. Preferred examples of alkyl groups represented by X include C1-3 alkyl groups, specifically methyl, ethyl, and propyl groups.

In Formula (V) above a is preferably $0.1 \leq a \leq 0.9$, more preferably in the range of $0.3 \leq a \leq 0.8$, even more preferably in the range of $0.5 \leq a \leq 0.7$. In Formula (V) above, b is preferably in the range of $0 \leq b \leq 0.5$, more preferably in the range of $0 \leq b \leq 0.3$, and particularly in the range of $0 \leq b \leq 0.1$. In Formula (V) above, c is preferably in the range of $0.1 \leq c \leq 0.7$, more preferably in the range of $0.2 \leq c \leq 0.6$, and particularly in the range of $0.3 \leq c \leq 0.5$. In Formula (II) above, d is preferably in the range of $0 \leq d \leq 0.4$, more preferably in the range of $0 \leq d \leq 0.25$, and particularly in the range of $0 \leq d \leq 0.1$. In Formula (II) above, e is preferably in the range of $0 \leq e \leq 0.15$, more preferably in the range of $0 \leq e \leq 0.1$, and particularly in the range of $0 \leq e \leq 0.05$.

In a preferred embodiment of the present disclosure, the (B-1) component resinous organohydrogenpolysiloxane is such that, in equation (V) above, c is greater than 0, that is, it includes a T unit. The (B-1) component resinous organohydrogenpolysiloxane may or may not, but preferably does not, include a Q unit.

In a preferred embodiment of the present disclosure, the (B-1) component resinous organohydrogenpolysiloxane contains a silicon atom-bonded hydrogen atom at a molecular terminal. The (B-1) component resinous organohydrogenpolysiloxane preferably has a silicon atom-bonded hydrogen atom in the M unit, and may or may not, and preferably does not, include a silicon atom-bonded hydrogen atom in molecular-chain side chains (that is, D units and T units).

In a preferred embodiment of the present disclosure, the (B-1) component resinous organohydrogenpolysiloxane contains an aryl group as a silicon atom-bonded organic group. That is to say, in Formula (V) above, at least one $R^4$ can be an aryl group. In a preferred embodiment of the disclosure, the (B-1) component resinous organohydrogenpolysiloxane contains a silicon atom-bonded aryl group in a molecular side chain, that is, in a D unit or T unit, and preferably in a T unit. The (B-1) component resinous organohydrogenpolysiloxane may or may not, and preferably does not, include an aryl group at the molecular terminal, that is, in the M unit. Note that, in terms of the aryl group, C6-20 aryl groups, and particularly a phenyl group, a tolyl group, a xylyl group, and a naphthyl group can be mentioned.

When the (B-1) component resinous organohydrogenpolysiloxane comprises an aryl group, the content thereof (mol % of aryl groups in all of the silicon atom-bonded functional groups of the resinous organohydrogenpolysiloxane) can be designed as desired, but is normally 1 mol % or more, preferably 5 mol % or more, more preferably 10 mol % or more, still more preferably 13 mol % or more, and particularly preferably 16 mol % or more, and can be 50 mol % or less, preferably 40 mol % or less, more preferably 35 mol % or less, preferentially 30 mol % or less, and particularly preferably 25 mol % or less. The aryl group content can, for example, be determined by analysis such as Fourier transform infrared spectrophotometry (FT-IR) or nuclear magnetic resonance (NMR).

The viscosity of the (B-1) component organopolysiloxane is not particularly limited, but is, for example, in the range of 10 mPa to 1000 mPa at 25° C. In the present specification, the viscosity of the organopolysiloxane component can be measured at 25° C. using a rotary viscometer conforming to JIS K7117-1.

When the (B) component includes the (B-1) component resinous organohydrogenpolysiloxane, the content thereof is not particularly limited, but based on the total mass of all the organopolysiloxane components included in the curable silicone composition of the present disclosure, is preferably 0.1% by mass or more, more preferably 0.5% by mass or more, still more preferably 1.5% by mass or more, and particularly preferably 2.5% by mass or more. The content of the (B-1) component is also preferably 15% by mass or less, more preferably 10% by mass or less, still more preferably 8% by mass or less, and particularly preferably 5% by mass or less, based on the total mass of all the organopolysiloxane components.

The (B) component may include a linear organohydrogenpolysiloxane as a component (B-2). The (B-2) component linear organohydrogenpolysiloxane can preferably be represented by Average Structural Formula (VI):

$R^4_3SiO(R^4_2SiO_{2/2})_mSiR^4_3$ (In Formula (VI), $R^4$ are hydrogen atoms or the same or different halogen-substituted or unsubstituted monovalent hydrocarbon groups other than alkenyl groups, provided that, in one molecule, at least two $R^4$ are hydrogen atoms; and m is 1-100).

In Formula (VI) above, the same groups as in Formula (V) above can be used for the halogen-substituted or unsubstituted monovalent hydrocarbon groups other than alkenyl groups of $R^4$.

In Formula (VI) above, m is preferably 1 to 50, more preferably 1 to 20, still more preferably 1 to 10, and particularly preferably 1 to 5.

According to a preferred embodiment of the present disclosure, the (B-2) component linear organohydrogenpolysiloxane has a silicon atom-bonded hydrogen atom at both ends of the molecular chain. The (B-2) component linear organohydrogenpolysiloxane has a silicon atom-bonded hydrogen atom in the M unit and may or may not, but preferably does not, include a silicon atom-bonded hydrogen atom in a D unit.

The (B-2) component linear organohydrogenpolysiloxane preferably has a silicon atom-bonded aryl group in a molecular-chain side chain. The (B-2) component linear organopolysiloxane may or may not, but preferably does not, include an aryl group in a molecular terminal.

According to one embodiment of the present disclosure, when the (B-2) component linear organohydrogenpolysiloxane includes an aryl group, the content of the aryl group in all of the silicon atom-bonded organic groups is not particularly limited, and for example, it is 10 mol % or more, preferably 15 mol % or more, more preferably 20 mol % or more of the total of the silicon atom-bonded organic groups, and can be 50 mol % or less, preferably 40 mol %, more preferably 30 mol % or less of the total of the silicon atom-bonded organic groups. The aryl group content can, for example, be determined by analysis such as Fourier transform infrared spectrophotometry (FT-IR) or nuclear magnetic resonance (NMR).

The content of the (B-2) component linear organohydrogenpolysiloxane in the (B) component is not particularly limited, but it can be included in an amount of preferably 1 mass % or more, more preferably 5 mass % or more, still more preferably 10 mass % or more based on the total mass of all the organopolysiloxane components of the curable silicone composition of the present disclosure, and furthermore can be included in an amount of 40 mass % or less, preferably 30 mass % or less, more preferably 25 mass % or less based on the total mass of all the organopolysiloxane components.

The content of the total component (B) is not particularly limited, but is preferably 1% by mass or more, more preferably 5% by mass or more, still more preferably 8% by mass or more, and particularly preferably 12% by mass or more, based on the total mass of the curable silicone composition. In a preferred embodiment, the content of component (B) is 40% by mass or less, more preferably 30% by mass or less, and still more preferably 25% by mass or less, based on the total mass of the curable silicone composition.

Further, in one embodiment of the present disclosure, the (B) component is included in an amount such that the ratio of the silicon atom-bonded alkenyl groups to the silicon atom-bonded hydrogen atoms included in the organopolysiloxane component is such that, with respect to 1 mol of the silicon atom-bonded alkenyl groups in the curable silicone composition, the silicon atom-bonded hydrogen atoms constitute 0.3 mol or more, preferably 0.5 mol or more, and more preferably 0.7 mol or more, and for example, the silicon atom-bonded hydrogen atoms constitute, with respect to 1 mol of the silicon atom-bonded alkenyl group in the curable silicone composition, 5 mol or less, preferably 4 mol or less, more preferably 3 mol or less, still more preferably 2 mol or less, and particularly preferably 1.6 mol or less.

(C) Epoxy Group-Containing Resinous Organopolysiloxane

The curable silicone composition according to the present disclosure includes an epoxy group-containing resinous organopolysiloxane represented by the following Average Unit Formula (I) as the component (C):

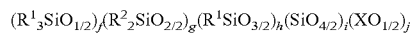

{in Formula (I), $R^1$ are, in each case, independently halogen-substituted or unsubstituted monovalent hydrocarbon groups, wherein at least two $R^1$ are alkenyl groups; $R^2$ are, in each case, independently halogen-substituted or unsubstituted monovalent hydrocarbon groups or epoxy group-containing organic groups, wherein at least one $R^2$ is an epoxy group-containing organic group; X is a hydrogen atom or an alkyl group; $0 \leq f < 1$; $0 < g < 1$; $0 \leq h < 0.9$; $0 \leq i < 0.5$; and $0 < j < 0.5$; $f+g+h+i+j=1.0$; $h+i > 0$; and $j/(f+g+h+i+j) > 0.05$}

The curable silicone composition according to the present disclosure may comprise one type of epoxy group-containing resinous organopolysiloxane (C), or may comprise two or more types of epoxy group-containing resinous organopolysiloxanes (C).

In Formula (I), the halogen-substituted or unsubstituted monovalent hydrocarbon groups of $R^1$ and $R^2$ are preferably selected from among C1-12 alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; C6-20 aryl groups such as phenyl, tolyl, xylyl, and naphthyl groups; C2-12 alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^1$ is preferably selected from among C1-6 alkyl groups, particularly a methyl group, C2-6 alkenyl groups, particularly a vinyl group, C6-20 aryl groups, particularly a phenyl group, and a 3-glycidoxypropyl group.

Furthermore, in Formula (I) above, examples of the epoxy group-containing organic groups of $R^2$ include: glycidoxyalkyl groups such as a 2-glycidoxyethyl, 3-glycidoxypropyl and 4-glycidoxybutyl groups; epoxycycloalkyl alkyl groups such as 2-(3,4-epoxycylohexyl)-ethyl and 3-(3,4-epoxycyclohexyl)-propyl groups; and epoxyalkyl groups such as 3,4-epoxybutyl and 7,8-epoxyoctyl groups; and glycidoxyalkyl groups are preferable, and a 3-glycidoxypropyl group is particularly preferable. $R^1$ is preferably selected from among C1-6 alkyl groups, particularly a methyl group, C2-6 alkenyl groups, particularly a vinyl group, C6-20 aryl groups, particularly a phenyl group, and a 3-glycidoxypropyl group. $R^2$ is preferably selected from among a hydrogen atom, C1-6 alkyl groups, particularly a methyl group, and a 3-glycidoxypropyl group.

In Formula (I) above, X is a hydrogen atom or an alkyl group. Preferred examples of alkyl groups represented by X include C1-3 alkyl groups, specifically methyl, ethyl, and propyl groups.

In Formula (I) above, on the basis of $f+g+h+i+j=1.0$, f is preferably in the range of $0.03 \leq f \leq 0.7$, more preferably in the range of $0.06 \leq f \leq 0.5$, and still more preferably in the range of $0.09 \leq f \leq 0.3$. In Formula (I) above, g is preferably in the range of $0.05 \leq g \leq 0.6$, more preferably in the range of $0.1 \leq g \leq 0.4$, and particularly in the range of $0.2 \leq g \leq 0.3$. In Formula (I) above, h is preferably in the range of $0.1 \leq h \leq 0.8$, more preferably in the range of $0.25 \leq h \leq 0.7$, and particularly in the range of $0.4 \leq h \leq 0.6$. In Formula (I) above, i is preferably in the range of $0 \leq i \leq 0.4$, and more preferably $0 \leq i \leq 0.25$, and in particular, $0 \leq i \leq 0.1$. In Formula (I) above, j is preferably in the range of $0.05 \leq j \leq 0.4$, more preferably in the range of $0.1 \leq j \leq 0.3$, and particularly in the range of $0.15 \leq j \leq 0.25$.

In Formula (I) above, $j/(f+g+h+i+j)$ is greater than 0.05. Preferably, $j/(f+g+h+i+j)$ is greater than 0.08, more preferably greater than 0.11, and still more preferably greater than 0.14. Furthermore, $j/(f+g+h+i+j)$ is normally less than 0.5, preferably less than 0.4, more preferably less than 0.3, and particularly preferably less than 0.25.

In a preferred embodiment of the present disclosure, the component (C) epoxy group-containing resinous organopolysiloxane is such that, in Formula (I) above, h is greater than 0, which is to say, it includes a siloxane unit represented by $SiO_{3/2}$ (T unit). The (C) component epoxy group-containing resinous organopolysiloxane may or may not, and preferably does not, include a siloxane unit represented by $SiO_{4/2}$ (Q unit).

In a preferred embodiment of the present disclosure, the component (C) epoxy group-containing resinous organopolysiloxane contains an alkenyl group at a molecular terminal. The epoxy group-containing resinous organopolysiloxane of component (C) preferably has an alkenyl group in the siloxane unit represented by $SiO_{1/2}$ (M unit), and may or may not, and preferably does not, have alkenyl groups in molecular side chains (which is to say, siloxane units represented by $SiO_{2/2}$ (D units) and siloxane units represented by $SiO_{3/2}$ (T units)).

The content of the epoxy group-containing resinous organopolysiloxane in all of the silicon atom-bonded organic groups of the (C) component epoxy group-containing resinous organopolysiloxane is not particularly limited, and for example, it is 1 mol % or more, preferably 5 mol % or more, and more preferably 8 mol % or more of the total of the silicon atom-bonded organic groups, and can be 30 mol % or less, preferably 20 mol %, more preferably 15 mol % or less of the total of the silicon atom-bonded organic groups. The alkenyl group content can, for example, be determined by using an analysis technique such as Fourier transform infrared spectrophotometry (FT-IR) or nuclear magnetic resonance (NMR), or by using the aforementioned titration method.

In a preferred embodiment of the present disclosure, the component (C) epoxy group-containing resinous organopolysiloxane includes an aryl group as a silicon atom-bonded organic group. That is to say, in Formula (I) above at least one of $R^1$ and $R^2$ can be an aryl group. In a preferred embodiment of the present disclosure, the component (C) epoxy group-containing resinous organopolysiloxane contains a silicon atom-bonded aryl group in a molecular-chain side chain, that is, in a D unit or T unit, and preferably a T unit. The (C) component epoxy group-containing resinous organopolysiloxane may or may not, and preferably does not, include an aryl group at the molecular terminal, that is, in the M unit. Note that, in terms of the aryl group, C6-20 aryl groups, and particularly a phenyl group, a tolyl group, a xylyl group, and a naphthyl group can be mentioned.

When the (C) component epoxy group-containing resinous organopolysiloxane comprises an aryl group, the content (mol % of aryl groups in all of the silicon atom-bonded functional groups of the epoxy group-containing resinous organopolysiloxane) can be designed as desired, and is preferably 15 mol % or more, more preferably 20 mol % or more, still more preferably 25 mol % or more, and particularly preferably 30 mol % or more, and can be preferably 70 mol % or less, more preferably 60 mol % or less, still more preferably 50 mol % or less, and particularly preferably 40 mol % or less. The aryl group content can, for example, be determined by analysis such as Fourier transform infrared spectrophotometry (FT-IR) or nuclear magnetic resonance (NMR).

The amount of epoxy group-containing organic groups in all of the silicon atom-bound organic groups in the (C) component epoxy group-containing resinous organopolysiloxane is not particularly limited, but is preferably 1 mol % or more, more preferably 5 mol % or more, more preferably 10 mol % or more, and particularly preferably 15 mol % or more, and is preferably 40 mol % or less, more preferably 30 mol % or less, and particularly preferably 25 mol % or less. The amount of the epoxy group-containing organic group can, for example, be determined by analysis such as Fourier transform infrared spectrophotometry (FT-IR) or nuclear magnetic resonance (NMR).

The viscosity of the (C) component epoxy group-containing resinous organopolysiloxane is not particularly limited, but is, for example, in the range of 50 mPa to 3000 mPa at 25° C. In the present specification, the viscosity of the organopolysiloxane component can be measured at 25° C. using a rotary viscometer conforming to JIS K7117-1.

The amount of epoxy group-containing resinous organopolysiloxane contained in the (C) component is not particularly limited, but based on the total mass of all the organopolysiloxane components included in the curable silicone composition of the present disclosure, this is preferably 0.5% by mass or more, more preferably 1% by mass or more, still more preferably 1.5% by mass or more, and particularly preferably 2% by mass or more. The content of component (A-1) is also preferably 15% by mass or less, more preferably 10% by mass or less, still more preferably 5% by mass or less, and particularly preferably 3% by mass or less, based on the total mass of all the organopolysiloxane components.

(D) Curing Catalyst

The (D) component curing catalyst is a hydrosilylation reaction curing component, and is a catalyst for promoting the curing of the curable silicone composition of the present disclosure. Examples of the (D) component are platinum catalysts such as chloroplatinic acid, alcohol solutions of chloroplatinic acid, platinum-olefin complexes, platinum-1,3-divinyl-1,1,3,3-tetramethyldisiloxane complexes, and platinum-supporting powder; palladium catalysts such as tetrakis(triphenylphosphine)palladium, and mixtures of triphenylphosphine and palladium black; and rhodium catalysts, and platinum catalysts are particularly preferable.

The amount of the (D) component blended is the amount of the catalyst, and more specifically when a platinum-based catalyst is used as the (D) component, based on the total mass of the curable silicone composition of the present disclosure, the amount of platinum atoms is preferably 0.01 ppm or more, more preferably 0.1 ppm or more, and more preferably 1 ppm or more, and based on the total mass of the curable silicone composition of the present disclosure, the amount of platinum atoms is preferably 20 ppm or less, more preferably 15 ppm or less, still more preferably 10 ppm or less, and particularly preferably 5 ppm or less.

Optional components can be blended into the curable silicone composition of the present disclosure within a range that does not adversely affect the object of the present disclosure. Examples of the optional components include an acetylene compound, an organophosphorus compound, a vinyl group-containing siloxane compound, inorganic fillers such as crushed quartz, silica, titanium oxide, magnesium carbonate, zinc oxide, iron oxide and diatomaceous earth, inorganic fillers obtained by subjecting the surface of said inorganic fillers to hydrophobic treatment with an organosilicon compound, hydrosilylation reaction inhibitors, organopolysiloxanes free from a silicon atom-bonded hydrogen atom and a silicon atom-bonded alkenyl group, tack imparting agents other than component (C), a heat resistance imparting agent, a cold resistance imparting agent, a heat conductive filler, a flame retardant, thixotropy imparting agent, phosphors, solvents, and the like.

Among the inorganic fillers, examples of silica include fumed silica, dry silica, wet silica, crystalline silica, precipitated silica, and the like. Furthermore, the silica can have been subjected to surface hydrophobic treatment using an organosilicon compound such as an organoalkoxysilane compound, organochlorosilane compound, organosilazane compound, or low molecular weight siloxane compound, or a silane coupling agent, titanate coupling agent or the like.

Based on the total mass of the composition of the present disclosure, the inorganic filler can preferably be included in the curable silicone composition of the present disclosure in an amount of 0.1% by mass or more, more preferably 1% by mass or more, and still more preferably 3% by mass or more, and can preferably be included in the curable silicone composition of the present disclosure in an amount of 20% by mass or less, more preferably 15% by mass or less, and more preferably 10% by mass or less.

The hydrosilylation reaction inhibitor is a component for suppressing the hydrosilylation reaction of the curable silicone composition. Examples of the curing reaction inhibitor include: alkyne alcohols such as 2-methyl-3-butyn-2-ol, 3,5-dimethyl-1-hexyn-3-ol, 2-phenyl-3-butyn-2-ol, and 1-ethynyl-1-cyclohexanol; enyne compounds such as 3-methyl-3-penten-1-yne and 3,5-dimethyl-3-hexen-1-yne; alkenyl group-containing low-molecular weight siloxanes such as tetramethyltetravinylcyclotetrasiloxane and tetramethyltetrahexenylcyclotetrasiloxane; and alkynyloxysilanes such as methyl-tris(1,1-dimethylpropynyloxy) silane and vinyl-tris(1,1-dimethylpropynyloxy) silane. Preferably, the hydrosilylation reaction inhibitor is selected from alkyne alcohols, and is particularly preferably 1-ethynyl-1-cyclohexanol. A reaction inhibitor is normally added in an amount of 0.001 to 5% by mass of the total composition.

Phosphors are widely used in light-emitting diodes (LEDs); examples of phosphors used are yellow-, red-, green-, and blue phosphors such as oxide phosphors, oxynitride phosphors, nitride phosphors, sulfide phosphors, oxysulfide phosphors, and fluoride phosphors, and mixtures of at least 2 of these. Examples of oxide phosphors are cerium ion-doped yttrium aluminum garnet (YAG) green to yellow phosphors; cerium ion-doped terbium aluminum garnet (TAG) yellow phosphors; and cerium and europium ion-doped silicate green to yellow phosphors. Examples of oxynitride phosphors are europium ion-doped silicon aluminium oxygen nitrogen (SiAlON) red-green phosphors. Examples of nitride phosphors are europium ion-doped calcium strontium aluminium silicon nitrogen (CaSrAlSiN) red phosphors. Examples of sulphide phosphors are copper ion- and aluminium ion-doped ZnS green phosphors. Examples of oxysulphide phosphors are europium ion-doped $Y_2O_2S$ red phosphors. Examples of fluoride phosphors are KSF phosphors ($K_2SiF_6:Mn^{4+}$).

The curable silicone composition according to the present disclosure can be cured to form a cured product having high hardness. With regard to the cured product obtained by curing the curable silicone composition of the present disclosure, a type D durometer hardness is 20 or more, preferably 30 or more, at 25° C. The type D durometer hardness is determined by using a type D durometer according to JIS K 6253-1997 "Hardness test method for vulcanized rubber and thermoplastic rubber".

The curable silicone composition according to the present disclosure can be cured to form a cured product having excellent transparency. Specifically, the cured product of the curable silicone composition of the present disclosure has a light transmittance of preferably 80% or more, more preferably 83% or more, and particularly preferably 85% or more at a wavelength of 400 nm to 700 nm. The light transmittance of the cured product of the curable silicone composition can be determined, for example, by measuring the cured product having an optical path length of 1, by way of a spectrophotometer.

The curable silicone composition according to the present disclosure has a high refractive index. For example, the refractive index of the curable silicone composition of the present disclosure at 25° C., as measured by an Abbe type refractive index meter, is preferably 1.4 or more, more preferably 1.43 or more, and even more preferably 1.45 or more.

The curable silicone composition according to the present disclosure can be cured to form a cured product having high tensile strength. For example, when the curable silicone composition of the present disclosure is applied in the form of a sheet to prepare a cured product in the form of a sheet having a thickness of 1 mm, this is punched into a dumbbell-shaped No. 3 shape specified in HS K 6251-1993 "Tensile test method for vulcanized rubber", and the tensile strength (MPa) is measured at a tensile speed of 500 mm/min using Autograph manufactured by Shimadzu Corporation, the tensile strength is preferably 1.8 MPa or more, more preferably 2 MPa or more, still more preferably 2.2 MPa or more.

The curable silicone composition of the present disclosure can be prepared by mixing the components. The method of mixing the components may be a conventionally known method, and is not particularly limited, and a uniform mixture is usually obtained by simple mixing. When a solid component such as an inorganic filler is included as an optional component, it is preferable to use a mixing device for the mixing. There are no particular limitations regarding this mixing device, and examples include single- and twin-screw continuous mixers, double roller mixers, Ross mixers, Hobart mixers, dental mixers, planetary mixers, kneader mixers, Henschel mixers, and the like.

[Sealing Material, Film]

The present disclosure also relates to a sealing material for semiconductors using the curable silicone composition of the present disclosure. The shape of the sealing material of the present disclosure is not particularly limited, but is preferably a dome shape or a sheet shape. The semiconductor to be sealed with the sealing material or film of the present disclosure is not particularly limited, and examples include semiconductors of SiC, GaN, etc., and particularly optical semiconductors such as power semiconductors and light emitting diodes.

The encapsulant of the present disclosure uses the curable silicone composition of the present disclosure, and therefore exhibits excellent thixotropy and has little shape change and a low shrinkage factor when cured. Therefore, a semiconductor package with excellent reliability can be manufactured.

[Optical Semiconductor Element]

The present disclosure also relates to an optical semiconductor element that is equipped with the sealing material of the present disclosure. The optical semiconductor element can be, for example, a light-emitting diode (LED), semiconductor laser, photodiode, phototransistor, or a light-emitting body or light-receiving body for photocoupler or solid-state imaging; it is particularly preferably a light-emitting diode (LED).

Light-emitting diodes (LEDs) emit light from the upper, lower, left and right sides of the optical semiconductor element, and so it is undesirable for parts constituting the light-emitting diode (LED) to absorb light, and materials having high light transmittance or high reflectance are preferred for said parts. Consequently, the substrate on which the optical semiconductor element is mounted also preferably comprises a material of high light transmittance or high reflectance. As the substrate on which the optical semiconductor element is mounted, for example, conductive metals such as silver, gold, and copper; non-conductive metals such as aluminum and nickel; thermoplastic resins mixed with white pigments such as PPA and LCP; thermosetting resins containing white pigments such as epoxy resins, BT resins, polyimide resins, and silicone resins; and ceramics such as alumina and alumina nitride may be used.

FIG. 1 shows a cross-sectional view of a single surface mount LED which is an example of a semiconductor device comprising the optical semiconductor element of the present disclosure. In the LED shown in FIG. 1, a light emitting element (LED chip) 1 is die-bonded on a lead frame 2, and the light emitting element (LED chip) 1 and a lead frame 3 are wire-bonded with a bonding wire 4. A frame material 5 is provided around the light emitting element (LED chip) 1, and the light emitting element (LED chip) 1 inside the frame material 5 is sealed by the cured product 6 of the curable silicone composition of the present disclosure.

The method for manufacturing the surface-mounted LED shown in FIG. 1 is exemplified by die bonding the light emitting element (LED chip) 1 to the lead frame 2, bonding the light emitting element (LED chip) 1 and the lead frame 3 with a gold bonding wire 4, then filling the curable silicone composition of the present disclosure inside the frame material 5 provided around the light emitting element (LED chip) 1, and subsequently curing by heating at 50 to 200° C.

The optical semiconductor element of the present disclosure is sealed with the sealing material of the present disclosure and thus exhibits excellent reliability.

EXAMPLES

The curable silicone composition of the present disclosure is described in greater detail through the following examples and comparative examples.

Curable silicone compositions were prepared by mixing the components as the formulation (parts by mass) shown in the table. It should be noted that hereinbelow, Me denotes methyl, Vi denotes vinyl, Ph denotes phenyl, and Ep denotes 3-glycidoxypropyl. In addition, the structure of the organopolysiloxane components is shown in a simplified manner in the table, and the functional groups other than Me in the M, D, or T unit are shown in parentheses. In addition, H/Vi indicates the molar ratio of the silicon atom-bonded hydrogen atom (H) and the vinyl group (Vi) in the organopolysiloxane components.

(Component a: Alkenyl Group-Containing Organopolysiloxane)
  Component a-1: Resinous alkenyl group-containing organopolysiloxane represented by the average unit formula $(ViMe_2SiO_{1/2})_{25}(PhSiO_{3/2})_{75}$
  Component a-2: Resinous alkenyl group-containing organopolysiloxane represented by the average unit formula $(ViMeSiO_{2/2})_{25}(Ph_2SiO_{2/2})_{30}(PhSiO_{3/2})_{45}$
  Component a-3: Resinous alkenyl group-containing organopolysiloxane represented by the average unit formula $(Me_3SiO_{1/2})_{14}(ViMe_2SiO_{1/2})_{11}(MeSiO_{3/2})_{53}(PhSiO_{3/2})_{22}$
  Component a-4: Linear alkenyl group-containing organopolysiloxane represented by the average structural formula $ViMe_2SiO(Me_2SiO)_{20}SiMe_2Vi$
  Component a-5: Linear alkenyl group-containing organopolysiloxane represented by the average structural formula $ViMe_2SiO(Ph_2SiO)_{30}(Me_2SiO)_{60}SiMe_2Vi$
  Component a-6: Organopolysiloxane containing a cyclic alkenyl group represented by the average structural formula $(ViMeSiO)_4$ (Component b: Organohydrogenpolysiloxane)
  Component b-1: resinous organohydrogenpolysiloxane represented by average unit formula $(HMe_2SiO_{1/2})_{60}(PhSiO_{3/2})_{40}$
  Component b-2: Linear organohydrogenpolysiloxane represented by the average structural formula $HMe_2SiO(Ph_2SiO)SiMe_2H$ (Component c: Epoxy Group-Containing Resinous Organopolysiloxane)
  Component c-1: Epoxy group-containing resinous organopolysiloxane represented by the average unit formula $(ViMe_2SiO_{1/2})_{13}(EpMeSiO_{2/2})_{24}(PhSiO_{3/2})_{46}(OMe)_{17}$
  Component c'-2: Epoxy group-containing resinous organopolysiloxane represented by the average unit formula $(ViMe_2SiO_{1/2})_{18}(EpMeSiO_{2/2})_{29}(PhSiO_{3/2})_{53}$
  Component c'-3: Epoxy group-containing resinous organopolysiloxane represented by the average unit formula $(ViMeSiO_{2/2})_{24}(PhMeSiO_{2/2})_{15}(EpSiO_{3/2})_{19}(OMe)_{42}$
  Component d: Complex of platinum and 1,3-divinyl-1,1,3,3-tetramethyldisiloxane having a platinum concentration of 4.0% by mass
  Component e: 1-ethynyl-2-cyclohexanol
  Component f: Fumed silica Example 1 and Comparative Examples 1 to 2

Curable silicone compositions were prepared by mixing the components with the composition (parts by mass) shown in Table 1. Furthermore, the following evaluations were carried out and the results are summarized in Table 1.

[Die Shear Strength]

The curable silicone composition for die bonding use was coated onto an aluminum substrate using a die bonder (AD830 PLUS, manufactured by ASM), then a 300 μm² LED chip was placed thereon, and this was cured under curing conditions of 150° C. for 2 hours. The chip die strength was then measured using a die shear tester (DAGE 4000 Bondtester, manufactured by Nordson DAGE).

[Light Extraction Efficiency]

A phosphor was added to the curable silicone composition obtained, this was mixed, injected into an optical semiconductor device as shown in FIG. 1, and heated at 150° C. for 2 hours so as to be cured. The light extraction efficiency of the optical semiconductor device obtained was determined by initial total radiant flux measurement using an integrating sphere.

TABLE 1

| Component | Example 1 | Comparative Example 1 | Comparative Example 2 |
|---|---|---|---|
| a-1 M(Vi)$_{25}$-T (Ph)$_{75}$ | 57.2 | 57.2 | 57.2 |
| a-4 M(Vi)-D(Ph)$_{20}$-M(Vi) | 17.1 | 17.1 | 17.1 |
| a-6 D(Vi)$_4$ | 0.2 | 0.2 | 0.2 |

TABLE 1-continued

| Component | Example 1 | Comparative Example 1 | Comparative Example 2 |
|---|---|---|---|
| b-1 $M(H)_{60}$-$T(Ph)_{40}$ | 3 | 3 | 3 |
| b-2 $M(H)$-$D(Ph)_2$-$M(H)$ | 20 | 20 | 20 |
| c-1 $M(Vi)_{13}$-$D(Ep)_{24}$-$T(Ph)_{46}$—$(OMe)_{17}$ | 2.5 | — | — |
| c'-2 $M(Vi)_{18}$-$D(Ep)_{29}$-$(Ph)_{53}$ | — | 2.5 | — |
| c'-3 $D(Vi)_{24}$-$D(Ph)_{15}$-$T(Ep)_{19}$-$(OMe)_{42}$ | — | — | 2.5 |
| Total organopolysiloxane components | 100 | 100 | 100 |
| d | 0.006 | 0.006 | 0.006 |
| e | 0.02 | 0.02 | 0.02 |
| H/Vi | 1 | 1 | 1 |
| Evaluation | | | |
| Die shear strength (N/cm)$^2$ | 433 | 484 | 270 |
| Total luminous flux (lm) | 15.3 | 14.8 | 15.2 |

On the basis of the test results in Example 1 and Comparative Examples 1 and 2 described above, the curable silicone composition according to the present disclosure exhibited the highest total luminous flux value and exhibited a die shear strength of more than 400. Therefore, the curable silicone composition according to the present disclosure can form a cured product having both excellent adhesive strength and light extraction efficiency.

Examples 2 to 3 and Comparative Examples 3 to 4

Curable silicone compositions were prepared by mixing the components with the composition (parts by mass) shown in Table 2. Furthermore, the following evaluations were carried out and the results are summarized in Table 2.

[Tensile Strength and Elongation]

The silicone compositions of Examples 2 to 3 and Comparative Examples 3 to 4 were applied in the form of a sheet and heated at 120° C. for 5 to 10 minutes to prepare a sheet-form hot-melt curing product having a thickness of 180 μm. The melt elastic modulus at 100° C. of each resulting hot-melt curing product was measured using a viscoelasticity meter (MCR302, manufactured by Anton Paar), and found to be 30-300 Pa. This was punched into a dumbbell-shaped No. 3 shape specified in JIS K 6251-1993 "Tensile test method for vulcanized rubber", and using an Autograph manufactured by Shimadzu Corporation, the tensile strength (MPa) and elongation at break (%) were measured at a tensile speed of 500 mm/min. Products having a tensile strength of 2 MPa or more and an extension at break of 200% or more can be said to have excellent handling workability as encapsulant film or laminate film.

[Heat Shrinkage Factor]

The resulting hot-melt curable silicone composition was formed into a 300 μm coating film on a release film using an automatic coating machine (Tester Industry Co., Ltd/PI-1210) and heat-aged in an oven at 120° C. for 5-10 minutes to obtain a hot-melt curing product. The melt elastic modulus at 100° C. of each resulting hot-melt curing product was measured using a viscoelasticity meter (MCR302, manufactured by Anton Paar), and found to be 30-300 Pa. The dimensions of the resulting coat film before and after heating were measured and used for the shrinkage factor. The shrinkage factor is preferably less than 1%.

TABLE 2

| Component | Example 2 | Example 3 | Comparative Example 3 | Comparative Example 4 |
|---|---|---|---|---|
| a-2 $D(Vi)_{25}$-$D(Ph)_2)_{30}$-$T(Ph)_{45}$ | 59.1 | 58 | 59.1 | 58 |
| a-4 $M(Vi)$-$D(Ph)_{20}$-$M(Vi)$ | 15.9 | 15.9 | 15.9 | 15.9 |
| a-6 $D(Vi)_4$ | 1.3 | 1.2 | 1.3 | 1.2 |
| b-1 $M(H)_{60}$-$T(Ph)_{40}$ | 3 | 3 | 3 | 3 |
| b-2 $M(H)$-$D(Ph)_2$-$M(H)$ | 19.7 | 19.4 | 19.7 | 19.4 |
| c-1 $M(Vi)_{13}$-$D(Ep)_{24}$-$T(Ph)_{46}$—$(OMe)_{17}$ | 1 | 2.5 | — | — |
| c'-2 $M(Vi)_{18}$-$D(Ep)_{29}$-$(Ph)_{53}$ | — | — | 1 | 2.5 |
| Total organopolysiloxane components | 100 | 100 | 100 | 100 |
| d | 0.01 | 0.01 | 0.01 | 0.01 |
| e | 0.02 | 0.02 | 0.02 | 0.02 |
| f | 3 | 3 | 3 | 3 |
| H/Vi | 1.05 | 1.05 | 1.05 | 1.05 |
| Evaluation | | | | |
| Tensile strength (MPa) | 3.0 | 2.2 | 1.7 | 1.7 |
| Elongation (%) | 220 | 210 | 250 | 250 |
| Shrinkage factor (%) | 0.9 | 0.8 | 2.5 | 2.1 |

Example 4 and Comparative Example 5

Curable silicone compositions were prepared by mixing the components with the composition (parts by mass) shown in Table 3. Furthermore, the following evaluations were carried out and the results are summarized in Table 3.

[Refractive Index]

The refractive index of the curable silicone composition at 25° C. was measured with an Abbe type refractive index meter. A light source of 589 nm was used for the measurement.

[Hardness of Cured Product]

The curable silicone composition obtained was heated at 150° C. for 2 hours in order to prepare a cured product having a thickness of 10 mm. The hardness of the cured product was measured by using a type D durometer specified in JIS K 7215-1986 "Plastic Durometer Hardness Test Method".

[Viscosity and Thixotropy Index]

Using a viscoelasticity measuring device (MCR302 manufactured by Anton Pearl Co., Ltd.), the curable silicone composition was rotated in the same direction at 1/s and 10/s on a cone plate having a cone diameter of 40 mm and a cone angle of 2° and the viscosity was measured. The measurement temperature was 25° C. in all cases. The thixotropy index was calculated as the viscosity ratio for (1/s)/(10/s).

[Light Transmittance of Cured Product]

The resulting curable silicone composition was placed between two transparent glass sheets and heated at 150° C. for 1 hour so as to be cured, and a test piece having an optical path length of 1 mm was prepared. The light transmittance of this test piece was measured at 25° C. using a self-recording spectrophotometer capable of measuring at any wavelength in the range of visible light (wavelengths of 400 nm to 700 nm). In Table 3, the values of the light transmittance at a wavelength of 450 nm are shown.

[Shape Stability]

With the resulting curable silicone composition, silicone coated on the glass substrate at a height of approximately 1 mm by using dispense molding was cured at 150° C. for 60 minutes in a constant temperature bath, the ratio of the height and diameter of the cured product before and after curing were measured, and the rate of change (%) of the ratio of the height and diameter of the cured product before and after curing was calculated. It can be said that the lower the rate of change, the more stable the shape.

TABLE 3

| Component | | Example 4 | Comparative Example 5 |
|---|---|---|---|
| a-3 $M_{14}$-$M(Vi)_{11}$-$T53$-$T(Ph)_{22}$ | | 63.1 | 63.1 |
| a-5 $M(Vi)$-$D(Ph)_2)_{30}$-$D_{60}$-$M(Vi)$ | | 17.1 | 17.1 |
| a-6 $D(Vi)_4$ | | 0.2 | 0.2 |
| b-1 $M(H)_{60}$-$T(Ph)_{40}$ | | 4.9 | 4.9 |
| b-2 $M(H)$-$D(Ph)_2)$-$M(H)$ | | 12.2 | 12.2 |
| c-1 $M(Vi)_{13}$-$D(Ep)_{24}$-$T(Ph)_{46}$—$(OMe)_{17}$ | | 2.5 | — |
| c'-2 $M(Vi)_{18}$-$D(Ep)_{29}$-$T(Ph)_{53}$ | | — | 2.5 |
| Total organopolysiloxane components | | 100 | 100 |
| d | | 0.005 | 0.005 |
| e | | 0.2 | 0.2 |
| f | | 4.5 | 4.5 |
| H/Vi | | 1 | 1 |
| Evaluation | | | |
| Refractive index | | 1.48 | 1.48 |
| Shore D hardness | | 36 | 36 |
| Viscosity | Shear speed 1/s | 104.9 | 89.1 |
| (Pa · s) | Shear speed 10/s | 30.6 | 28.8 |
| | Thixotropy index | 3.4 | 3.1 |
| Light transmittance (%, 450 nm) | | 88 | 88 |
| Shape change rate (%) | | 83 | 87 |

As can be understood from the results in Tables 2 and 3 above, the curable silicone compositions of the present disclosure including a filler exhibited excellent thixotropy and light extraction efficiency, and can provide curable silicone compositions with reduced shape change and shrinkage factor when cured.

The curable silicone composition according to the present disclosure can form a cured product having both excellent adhesive strength and light extraction efficiency. Further, when a filler or a phosphor is included, because the dispersibility of the filler or the phosphor is improved, excellent thixotropy is achieved, even if a small amount of the filler or the phosphor is added, while maintaining excellent light extraction efficiency, and it is possible to form cured products in which shape change shrinkage factors when cured are reduced. Therefore, the cured silicone compositions of the present disclosure are extremely useful, for example, as domed or sheet-form encapsulants in the manufacture of semiconductor packages.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

What is claimed is:

1. A curable silicone composition comprising:
   (A) an alkenyl group-containing organopolysiloxane having at least two alkenyl groups per molecule;
   (B) an organohydrogenpolysiloxane having at least two silicon atom-bonded hydrogen atoms per molecule;
   (C) an epoxy group-containing resinous organopolysiloxane represented by Average Unit Formula (I):

$(R^1_3SiO_{1/2})_f(R^2_2SiO_{2/2})_g(R^1SiO_{3/2})_h(SiO_{4/2})_i(XO_{1/2})_j$

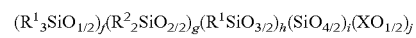

wherein, in Formula (I),
   $R^1$ are, in each case, independently halogen-substituted or unsubstituted monovalent hydrocarbon groups, wherein at least two $R^1$ are alkenyl groups;
   $R^2$ are, in each case, independently halogen-substituted or unsubstituted monovalent hydrocarbon groups or epoxy group-containing organic groups, wherein at least one $R^2$ is an epoxy group-containing organic group;
   X is a hydrogen atom or an alkyl group;
   $0 \leq f < 1$; $0 < g < 1$; $0 \leq h < 0.9$; $0 \leq i < 0.5$;
   $0 < j < 0.5$; $f+g+h+i+j=1.0$; $h+i>0$; and
   $j/(f+g+h+i+j) \geq 0.05$}; and
   (D) a curing catalyst.

2. The curable silicone composition according to claim 1 wherein, in Formula (I), at least 30 mol % of $R^1$ are aryl groups.

3. The curable silicone composition according to claim 1, wherein the (A) alkenyl group-containing organopolysiloxane includes resinous organopolysiloxane, linear organopolysiloxane, or both, in which the quantity of aryl groups in all of the silicon atom-bonded functional groups is 20 mol % or more.

4. The curable silicone composition according to claim 1, wherein the (A) alkenyl group-containing organopolysiloxane includes resinous organopolysiloxane, in which the quantity of aryl groups in all of the silicon atom-bonded functional groups is 20 mol % or more.

5. The curable silicone composition according to claim 1, wherein the (A) alkenyl group-containing organopolysiloxane includes linear organopolysiloxane, in which the quantity of aryl groups in all of the silicon atom-bonded functional groups is 20 mol % or more.

6. The curable silicone composition according to claim 1, wherein the (B) organohydrogenpolysiloxane contains both linear organohydrogenpolysiloxane and resinous organohydrogenpolysiloxane.

7. The curable silicone composition according to claim 6, wherein in the (A) alkenyl group-containing organopolysiloxane the quantity of aryl groups in all of the silicon atom-bonded functional groups is 20 mol % or more.

8. The curable silicone composition according to claim 1, further comprising silica as an inorganic filler.

9. An encapsulant including the curable silicone composition according to claim 1.

10. An optical semiconductor device, comprising the encapsulant according to claim 9.

* * * * *